United States Patent [19]
Swanson

[11] 3,751,053
[45] Aug. 7, 1973

[54] CHUCK WITH CENTERING AND COMPENSATING JAWS

[75] Inventor: Linwood B. Swanson, Newington, Conn.

[73] Assignee: Cushman Industries, Incorporated, Hartford, Conn.

[22] Filed: Apr. 24, 1972

[21] Appl. No.: 247,095

[52] U.S. Cl. .................. 279/119, 279/1 J, 279/1 L, 279/4
[51] Int. Cl. ............................................. B23b 31/00
[58] Field of Search ..................... 279/119, 1 J, 1 L, 279/110, 4

[56] References Cited
UNITED STATES PATENTS

| | | | |
|---|---|---|---|
| 2,524,485 | 10/1950 | Sloan | 279/119 |
| 2,880,009 | 3/1959 | Gamet | 279/119 |
| 3,142,491 | 7/1964 | Ohashi | 279/4 |
| 3,684,304 | 8/1972 | Dexter et al. | 279/119 |

*Primary Examiner*—Donald R. Schran
*Attorney*—Walter Spruegel

[57] ABSTRACT

A chuck having a set of centering jaws and a set of compensating jaws, two axially movable plungers operatively connected with the jaws of the respective sets, with the plunger for the compensating jaws including a ball member with a universally movable socket member thereon for compensating action of the associated jaws, and fluid-operated mechanism operative to move the plungers for closure of the centering jaws on work before the compensating jaws close thereon, and for applying full work-gripping force to the jaws only when all jaws are in engagement with work. The compensating jaws are convertible into centering jaws by releasably locking the socket member to the ball member against movement from a neutral position in which the converted jaws are held centered on the chuck axis.

10 Claims, 8 Drawing Figures

Fig. 3A er walls which may be slightly out-of-round and also vary somewhat in thickness, and which have a more or less pronounced tendency to yield in temporary distortion to jaw pressure as ordinarily applied for a secure work grip.

CHUCK WITH CENTERING AND COMPENSATING JAWS

This invention relates to chucks in general, and to chucks for hollow work in particular.

The present invention is concerned with a chuck for holding hollow work especially, though not exclusively, with lighter peripheral walls which may be slightly out-of-round and also vary somewhat in thickness, and which have a more or less pronounced tendency to yield in temporary distortion to jaw pressure as ordinarily applied for a secure work grip.

It is an important object of the present invention to provide a chuck of a type which will hold hollow work of the aforementioned lighter peripheral walls in a manner which will permit machining of the inner and outer work surfaces to fairly high precision in the uniformity of the wallthickness peripherally throughout and round condition of the peripheral wall, with such deviation of the finished peripheral wall from truly round, as may occur, being so very minimal as to be entirely tolerable for all contemplated practical purposes, including forcing the finished work into or onto a machined support surface of precise cylindrical shape and thereby forcing the peripheral wall of the work into, and locking it in, precise conformity with the cylindrical support surface.

It is another object of the present invention to provide a chuck of this type which, for the aforementioned precision machining of hollow work with lighter peripheral walls, provides jaws of a number to afford the work supports that are spaced fairly closely around the work, and this number of jaws is divided into two sets, of which the jaws of one set are centering jaws, and the jaws of the other set are operable as compensating jaws which adapt themselves to gripping the work as it is held by the centering jaws, with the jaws being preferably operated to exert the same pressure grip on the work and for closure of the centering jaws on the work before closure of the compensating jaws thereon. With this arrangement, the work centering jaws are preferably and advantageously three in number, not only because three jaws afford complete location of the work, but even more important, they will exert exactly the same pressure grip on the work, while the remaining jaws are preferably of the maximum permissible number of three for their operation as true compensating jaws which also exert exactly the same pressure grip on the work, thereby also permitting equiangular spacing of the centering jaws and of the compensating jaws. By providing these relatively numerous jaws in the form of centering and compensating jaws and spacing them equally, the work gripping pressures of the individual jaws may be so relatively light, and these will be exerted on such fairly closely spaced perpheral work portions, that temporary work distortion, if any, by the gripping jaws is very small and negligible for all practical purposes, yet the combined gripping force of all jaws on the work is entirely adequate securely to hold the latter for and during machining. Thus, in machining such hollow work, the jaws may first be closed on the outer work surface, for example, and the inner work surface then machined from rough to finish, with this machined inner surface being truly cylindrical, subject only to becoming slightly distorted if on release of the work from the jaws the work should recover from equally slight temporary distortion to which it may have been subjected by the gripping jaws. The same or substitute jaws may then be closed on the machined inner surface, first the centering jaws and then the compensating jaws, and the outer work surface may then be machined from rough to finish, with the combined jaws acting, by their equal force exertion on the work, to hold the inner, already machined, work surface throughout to accurate cylindrical disposition about the chuck axis, subject only to possible, but slight and in most cases entirely tolerable, deviation therefrom from different causes, including give of the jaw-gripped work portions unevenly to different jaws owing to such internal work factors as varying hardness or grain structure or a locally differing permanent stress pattern, for example.

It is a further object of the present invention to provide a chuck of this type in which the aforementioned sets of centering and compensating jaws have, for their operation as such, separate actuators, each including a plunger reciprocable axially of the chuck axis and operable on movement in opposite directions to close and open the associated jaw set, and these plungers are for their operational movements connected with a rotary cylinder and piston component of a chuck-operating mechanism having a swivel coupling with companion members of which one turns with the cylinder component and the other is non-turning and has two fluid ports which through orifices in the coupling and cylinder component lead to the chuck-closing and chuck-opening cylinder ends for admitting fluid under pressure to either end and simultaneously vent the other end, with the cylinder and piston component of the chuck-operating mechanism being provided with two separate coaxial cylinders each having a piston therein which is connected with one of the jaw-actuating plungers, and the orifices in the coupling and cylinder component being arranged for so distributing fluid under pressure to either end of both cylinders that the piston associated with the centering jaws will conclude its jaw-closing stroke before the other piston concludes its jaw-closing stroke for the aforementioned closure of the centering jaws on work before the closure of the compensating jaws thereon, yet the pistons will not apply full work-gripping force to their associated jaws until all jaws, centering and compensating ones, are in engagement with the work, when the pistons will simultaneously apply full work-gripping force to their associated jaws.

Another object of the present invention is to provide a chuck of this type in which the swivel coupling and cylinder component of the chuck-operating mechanism are provided with two main orifices which lead from the fluid ports in the non-turning coupling member to the opposite ends, respectively, of the cylinder associated with the centering jaws, and branch orifices lead from the main orifices to the opposite ends, respectively, of the other cylinder, of which the main orifices are throughout of larger cross-sectional area than the branch orifices, wherefore on admission of fluid under pressure to either main orifice leading to the then active chuck-closing end of the cylinder associated with the centering jaws, the piston therein will conclude its jaw-closing stroke before the other piston concludes its stroke for closing the compensating jaws, and the pistons will apply full working gripping force to their associated jaws only at the moment when all jaws are in engagement with the work, as aforementioned.

A further object of the present invention is to provide a chuck of this type which leads itself to ready conversion of its compensating jaws to centering jaws for their action as such in full cooperation with the other, permanent centering jaws, thereby permitting the use of the chuck as a pure work-centering chuck for holding any round work, including hollow work of the aforementioned lighter peripheral walls. Thus, in holding hollow work of such a lighter peripheral wall with the centering and compensating jaws for and during machining the exemplary inner work surface as described hereinbefore, the compensating jaws are advantageously converted into centering jaws to cooperate with the permanent centering jaws for holding the same work for machining the outer surface thereof. In so doing, the converted and permanent centering jaws, which then close on the inner machined work surface in this exemplary operation, so close on the work in the characteristic manner of centering jaws, i.e., they are in any position equally spaced with their work-gripping surfaces from the chuck axis, so that all jaws will continue to move in equal increments until their work-gripping surfaces are in the same uniform engagement with the inner work surface even if this should entail local yielding of the work to any or all gripping jaws, which means that all jaw-engaged portions of the inner work surface are centered on the chuck axis with the utmost accuracy which virtually rules out any distortion of the inner work surface from its accurate cylindrical machining, so that machining of the outer work surface will leave the same as accurately cylindrical, and also as accurately centered on the chuck axis, as the jaw-gripped machined inner work surface, and the thickness of the peripheral wall of the work will be most uniform and remain so after release of the work from the jaws.

It is another object of the present invention to provide a chuck of this type in which the compensating and centering jaws are operated by their respective actuating plungers through intermediation of pivoted rockers in the chuck body, and the plunger associated with the compensating jaws, i.e., the "compensating plunger," is provided with a part-spherical head and a surrounding ring having limited universal movability on the head and being operatively connected with the rockers for the compensating jaws, so that on the jaw-closing stroke of this plunger the ring thereof will characteristically find its own position on the part-spherical head in which all compensating jaws are evenly closed on the work. For the aforementioned conversion of the compensating jaws, provisions are made for quickly locking the compensating plunger to the other, centering plunger, not only for joint reciprocal motion with the latter but also for lock of the ring on its part-spherical head in a neutral position in which the work-gripping surfaces of the converted jaws are held precisely centered on the chuck axis, with the compensating plunger in its locked condition also holding the work-gripping surfaces of the converted jaws at the same exact distance from the chuck axis as the work-gripping surfaces of the permanent centering jaws.

It is a further object of the present invention to provide a chuck of this type in which the aforementioned centering and compensating plungers are outer and inner plungers, respectively, of which the outer plunger is in form of a cup with a bottom and an annual rim which is open toward the front of the chuck and is internally threaded at its open end, the inner plunger is received in the outer plunger, and the rocker arms operated by the inner plunger extend through clearance apertures in the outer plunger, with the inner plunger being, for conversion of the compensating jaws into centering jaws, locked to the outer plunger as aforementioned, by being solidly backed against the bottom of the outer plunger on simply driving a plug into the threaded open end of this outer plunger, and in thus backing the inner plunger against, and locking it to, the bottom of the outer plunger, the rocker-operating ring of the inner plunger is with its plane rear face also backed against the bottom of the outer plunger and thereby locked in the aforementioned neutral position. With this arrangement, and in order to afford the inner plunger the required freedom of motion, both reciprocal and universal, to properly actuate the associated jaws as compensating jaws with interference from the outer plunger, the compensating jaws may be made of adjustable type. In that case, these jaws are, for compensating action, adjusted so as to be placed with their work-gripping surfaces closer to, and farther away from, the chuck axis than the work-gripping surfaces of the other jaws, for contemplated gripping by the compensating jaws of outer and inner work surfaces, respectively, whereby the compensating jaws will uniformly engage the work while the inner plunger is still spaced from the bottom of the outer plunger when the latter is in its jaw-closing position. On the other hand, these compensating jaws will, for their conversion into accurate centering jaws, require readjustment so that their work-gripping surfaces will this time be spaced from the chuck axis exactly the same as the work-gripping surfaces of the permanent centering jaws. Of course, and as customary, the work-gripping jaws, whether of compensating or centering action, are really top jaws which are removably mounted on master jaws, and it is the master jaws which are operated by the respective compensating and centering plungers to act in compensating and centering fashion, respectively, with the top jaws acting in compensating or centering fashion by virtue of their mount on the respective master jaws, wherefore the aforementioned adjustments of the compensating and converted centering jaws involve adjustment of the respective top jaws on their master jaws. However, since for most practical machine operations on hollow work in this chuck, the work is held with compensating and centering top jaws for machining the inner or outer work surface, and the work is held with all top jaws acting as centering jaws for machining the other work surface, and since for good and sufficient reasons it is preferred, and for many operations even imperative, to use different top jaws with inner and outer work-gripping surfaces, respectively, for holding work at its respective outer and inner surfaces, the procedure followed far more often than not is replacement of one set of compensating top jaws of one type of work-gripping surfaces with another set of top jaws of the other type of work-gripping surfaces, rather than adjustment of the same set of top jaws. In following this latter procedure, the mounts on the master jaws for the replaceable top jaws are advantageously preassigned and arranged for immediate correct location of the latter on the respective master jaws without requiring an operator to concern himself with proper spacing of the work-gripping surfaces of these replaceable top jaws from the chuck axis for their contemplated compensating or centering action.

Another object of the present invention is to provide an alternate chuck of this type which also lends itself to ready conversion of the compensating top jaws into centering top jaws, yet these top jaws are, for action in compensating fashion, spaced with their work-gripping surfaces from the chuck axis exactly the same as the work-gripping surfaces of the permanent centering top jaws in the aforementioned neutral position of the rocker-operating ring on the part-spherical head on the compensating plunger, With this arrangement, there is no need for any adjustment of the top jaws on the compensating master jaws for conversion of the former from compensating top jaws into centering top jaws, and vice versa. To this end, the compensating plunger is arranged, relative to the centering plunger, to have complete freedom of reciprocal and universal motion for compensating action of the associated master jaws and top jaws thereon, and for conversion of these master jaws from compensating jaws into centering jaws, the rocker-operating ring on the part-spherical head on the compensating plunger is releasably locked in the aforementioned neutral position, and this plunger is also releasably locked to the centering plunger in a position in which the work-gripping surfaces of the associated top jaws are spaced from the chuck axis equally as the work-gripping surfaces of the top jaws on the permanent centering master jaws. While with this arrangement, the centering top jaws on all master jaws will simultaneously be moved into and from gripping engagement with work, there is also an alternative arrangement which is exactly like the arrangement just described, except that for conversion of the compensating master jaws and top jaws thereon into centering jaws the compensating plunger is not locked to the centering plunger. Accordingly, the compensating plunger is, even for centering action of the associated master and top jaws, operated by its own piston which, as aforementioned, concludes its jaw-closing stroke after the other piston for the centering plunger concludes its jaw-closing stroke, wherefore the permanent centering top jaws will engage the work before the converted centering top jaws engage the work, but the work will nevertheless be accurately centered on the chuck axis by the time all top jaws are in engagement with the work, for it is only when all top jaws are in engagement with the work that they exert their full gripping force on the work.

Further objects and advantages will appear to those skilled in the art from the following, considered in conjunction with the accompanying drawings.

In the accompanying drawings, in which certain modes of carrying out the present invention are shown for illustrative purposes.

Figures 1, 5:
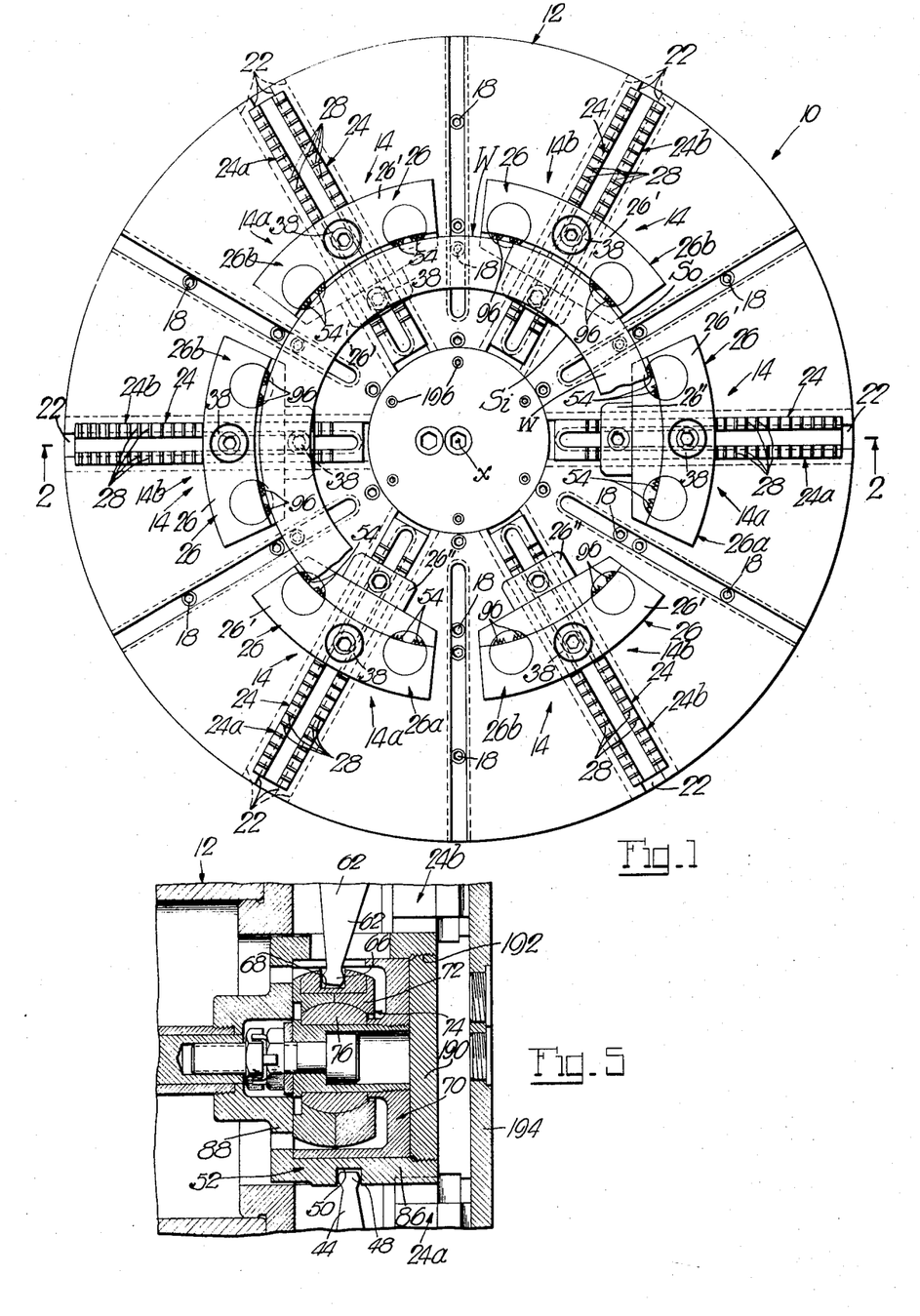
FIG. 1 is a front view of a chuck embodying the invention.
FIG. 5 is another fragmentary section through the chuck simular to that of FIG. 2, but showing the chuck conditioned for different operation.
Figure 2:
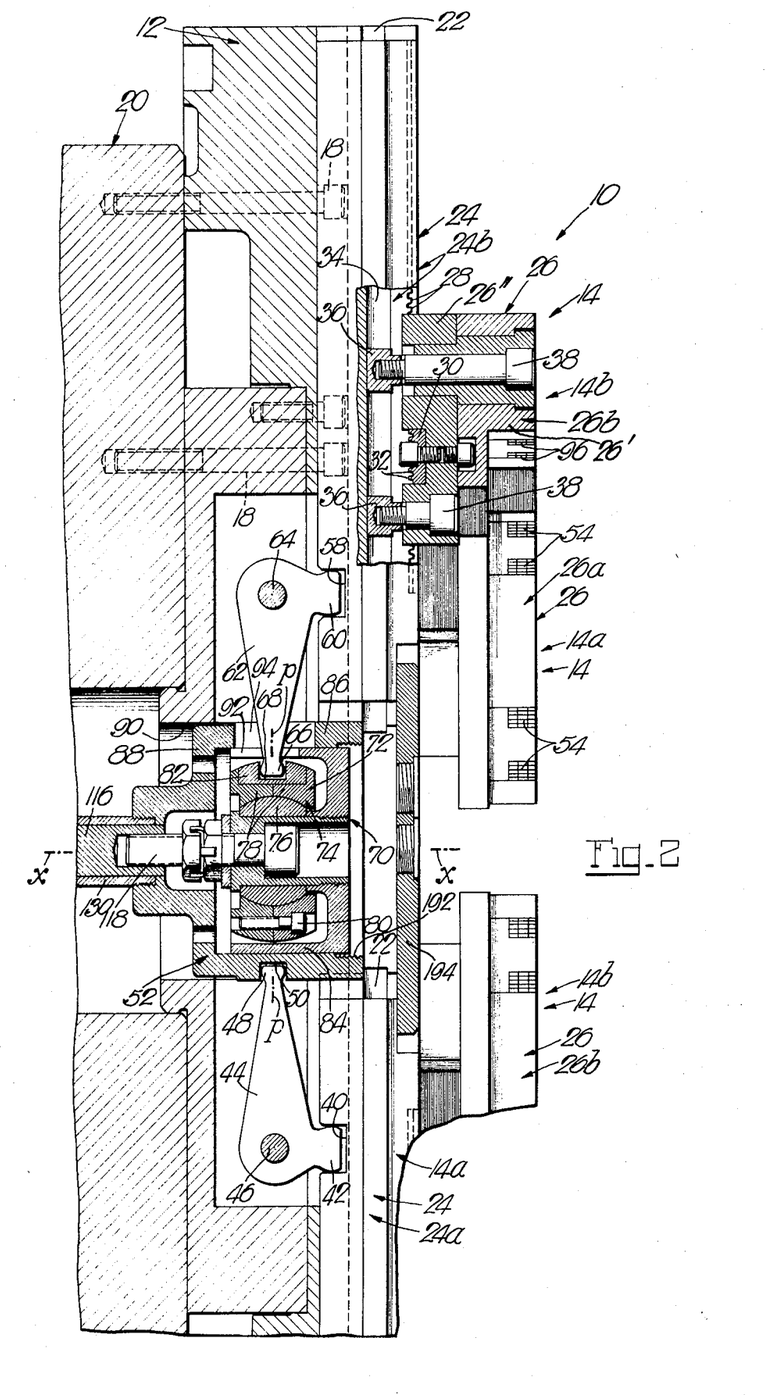
FIG. 2 is an enlarged fragmentary section through the chuck taken substantially on the line 2—2 of FIG. 1.

Referring to the drawings, and more particularly to FIGS. 1 to 4 thereof, the reference numeral 10 designates a chuck having a body 12, a plurality of operating jaws 14, and chuck operating mechanism 16. The chuck body 12, which has an axis $x$ that is also the chuck axis, is removably mounted at 18 to an exemplary power spindle 20 of a lathe or other machine tool for the drive of the chuck about the axis $x$ (FIG. 2). The chuck body 12 is in its front provided with a plurality of radial guideways 22 of exemplary dovetail section, with these guideways being equiangularly spaced (FIGS. 1 and 2).

The jaws 14, which are identical in this instance, are received in the guideways 22 in the chuck body for their operation into and from closure on work. Each of the jaws 14 provides in this instance a master element 24 and a work-gripping top element 26, of which the master element 24 is guided in the chuck body 12, and the top element 26 is removably mounted on the master element 24 (FIGS. 1 and 2). Each master jaw element 24 is in this instance serrated as at 28, and the associated top jaw element 26 carries a key 30 with serrations 32 which are meshable with any serrations 28 of the master jaw element for locating the top jaw element on the master jaw element 24 in different radial positions thereon. For the removable mount of each top jaw element 26 on the associated master jaw element 24 in different radial positions on the latter, the master jaw element is provided with a longitudinal groove 34 of dovetail section in which are slidably received fitted keys 36 with tapped holes for receiving the threaded shanks of screws 38 in the top jaw element. Thus, on tightening the screws 38 on the keys 36, each top jaw element 26 is with its key 30 firmly locked to the associated serrated master jaw element 24, and the top jaw element is removable from the master jaw element on simply removing the screws 38 from the keys 36. For adjustment of each top jaw element 26 on its associated master jaw element 24, the screws 38 are simply loosened sufficiently to permit retraction of the top jaw element with its key 30 out of mesh with the serrations of the master jaw element, whereupon the top jaw element is moved to a new radial position on the master jaw element and its key 30 remeshed with the serrations of the latter, with the screws 38 being then retightened to lock the top jaw element to the master jaw element in its new position thereon.

In accordance with an important aspect of the present invention, a number of the jaws 14 are to operate as work-centering jaws and the remaining jaws are to operate in compensating fashion. In the present instance, three of the exemplary overall number of six jaws are to operate as work-centering jaws, with the latter being designated by the reference numerals 14a, while the three remaining jaws 14b are to operate in compensating fashion.

For operation of the work-centering jaws 14a, their master jaw elements 24a are provided in the rear with transverse grooves 40 (FIG. 2) into which project the outer ends 42 of rockers 44 which at 46 are pivotally mounted in the chuck body 12 and project with their inner ends 48 into peripheral grooves 50 in an operating plunger 52. Plunger 52, which is coaxial with the chuck axis $x$, is axially slidable in the chuck body 12. Thus, with the jaws 14a, and more particularly their top jaw elements 26a, having in this instance inner work-gripping surfaces 54 for holding work at its outer peripheral surface, the jaws 14a are moved into and from closure on work on axial movement of the plunger 52 to the left and right, respectively, in FIG. 2. Furthermore, the jaw-operating parts 44 and 52 are so arranged that they keep the jaws 14a, including their top jaw elements 26a, centered on the chuck axis $x$ in any position of the operating plunger 52. This plunger 52 is, by virtue of its association with the work-centering jaws 14a, appropriately termed the "centering" plunger.

For operation of the compensating jaws 14b, their master jaw elements 24b are provided in the rear with transverse grooves 58 (FIG. 2) into which project the outer ends 60 of rockers 62 which at 64 are pivotally mounted in the chuck body 12 and project with their inner ends 66 into transverse grooves 68 in another operating plunger 70, with the latter being also coaxial with the chuck axis $x$ and axially slidable in the chuck body 12. The grooves 68 are provided in a socket member 72 of a ball-and-socket joint 74, the ball member 76 of which is fixed to, and hence movable with, the plunger 70, with the socket member 72 being mounted on the ball member 76 for limited universal motion thereon. The socket member 72 is formed in two complemental sections 78 which are bolted together at 80, with the grooves 68 being provided in this instance in inserts 82 in the sections 78 of the socket member 72. The plunger 70 is in this instance provided with an outer annular skirt 84 that is slidably received in an annular rim formation 86 of the other plunger 52 which is of general cup-shape, having also a bottom 88, with this other plunger 52 being with the outer peripheral surface of its rim formation 86 slidable in a center aperture 90 in the chuck body 12. The rockers 62 extend through clearance slots 92 in the annular skirt 84 of the plunger 70 and also through clearance slots 94 in the annular rim formation 86 of the other plunger 52 (FIG. 2). The plunger 70, including its ball and socket members 76 and 72, is thus arranged within the outer, centering, plunger 52. The plunger 70, being associated with the compensating jaws 14b, is for that reason appropriately termed the "compensating" plunger. Thus, with the compensating jaws 14b, and more particularly their top jaw elements 26b, having exemplary inner work-gripping surfaces 96, the same as the work-centering jaws 14a, the jaws 14b are moved into and from closure on work on axial movement of the compensating plunger 70 to the left and right, respectively, in FIG. 2.

In operation of the chuck, and for reasons explained hereinafter, the centering jaws 14a will close on work before the compensating jaws 14b close thereon, and the jaws 14a and 14b will simultaneously exert their full gripping force on work only when all jaws are in engagement with the work. Thus, exemplary hollow work W is with its outer peripheral surface $S_o$ held gripped by the jaws 14a and 14b (FIG. 2). Let it be assumed that this work W is a raw blank whose inner peripheral surface $S_i$ is to be machined cylindrical. With the work W being a raw blank, its peripheral wall $w$ may be out of round, more or less, and its wall thickness may vary, more or less, peripherally throughout. Accordingly, on closure of the jaws, the centering jaws 14a will first close on the outer work periphery and thereby locate the work with its jaw-engaged outer peripheral surface portions centered on the chuck axis, whereupon the compensating jaws 14b will close on the work, with each of these compensating jaws 14b coming to an independent stop when engaging the confronting outer peripheral surface of the work in its location as fixed by the centering jaws 14a. Under the circumstances, the outer peripheral work surface portions confronting the respective compensating jaws 14b are more than likely differently spaced from the chuck axis $x$, meaning that of the exemplary three compensating jaws one or two of them will still be out of engagement with the work and continue to move toward the latter when the remaining compensating jaw or jaws are closed on the work and, hence, move no longer. Closure of the compensating jaws 14b on the work in this progressive fashion is made possible by the freedom of universal motion of the socket member 72 on the ball member 76 on the plunger 70, with this socket member 72 giving way, in universal motion on the ball member 76, to whatever displacement any one of the rockers 62 requires to bring its associated compensating jaw into engagement with the work after the other compensating jaws are already in engagement with the work. The socket member 72, the compensating jaws 14b, and their rocker connections 62, are so arranged that these jaws, and more particularly the work-gripping surfaces 96 of their top jaw elements 26b, are centered on the chuck axis $x$ when the socket member 72 is in a neutral position (FIG. 2) in which its median plane $p$ extends normal to the chuck axis $x$. However, in operation of the compensating jaws 14b, the socket member 72 will assume a position deviating from its explained neutral positon whenever the combined work surface portions engaged by these jaws are off-center with respect to the chuck axis $x$. Thus, the socket member 72 may deviate from its neutral position to an extent like or similar to that shown in FIG. 4, for example, when all compensating jaws 14b are in engagement with the exemplary work W.

To operate the plungers 52 and 70 for closing and opening the jaws 14, the chuck operating mechanism 16 provides a cylinder unit 98 (FIG. 3) forming two cylinders 100 and 102 which are arranged end-to-end and coaxial with the chuck axis $x$, with this cylinder unit 98 being at 104 mounted on the rear end of the power spindle 20 so as to turn with the chuck which is mounted on the front end of this power spindle. Received in the cylinders 100 and 102 are pistons 106 and 108 which are operatively connected with the jaw-operating plungers 52 and 70, respectively. To this end, the piston 108 in the rear cylinder 102 is at 110 connected with a rod 112 which extends through the front cylinder 100 and is therebeyond connected at 114 with the rear end of a drawbar 116 the front end of which is at 118 connected with the compensating plunger 70 (FIG. 2). The other piston 106 in the front cylinder 100 is at 120 connected with a sleeve 122 which is received with a sliding and sealing fit on the piston rod 112 and extends in sealed fashion through an aperture 124 in the front wall 126 of the front cylinder 100, with the sleeve 122 being at 128 connected with the rear end of a draw sleeve 130 the front end of which is connected with the centering plunger 52 (FIG. 2). Thus, on admission of fluid under pressure to the front ends 132 and 134 of the cylinders 100 and 102 and venting the rear ends 136 and 138 of these cylinders, the plungers 52 and 70 will be moved to the left (FIG. 2) to cause closure of the jaws 14 on work. Conversely, on admitting fluid under pressure to the rear cylinder ends 136, 138 and venting the front cylinder ends 132 and 134, the plungers 52 and 70 will be moved to the right (FIG. 2) to cause opening of the jaws 14. The cylinders 100, 102 and the jaw-operating rockers 44, 62 are preferably so arranged that the centering and compensating jaws 14a and 14b exert the same gripping force on work.

The cylinder unit 98 is in this instance part of a swivel coupling 140 having companion members 142 and 144, of which coupling member 142 is part of, and in this instance formed by, the cylinder unit 98 and, hence, is operationally turnable, and the other coupling member 144 is held against rotation and is carried by the turnable coupling member by being suitably journalled therein. The coupling member 144 has two ports 146 and 148 which are in communication with the cylinders 100 and 102. Thus, port 146 is in communication with a passage 150 in the coupling member 144, with this passage 150 being, in turn, in communication with a passage 152 in the piston rod 112 in any position of the associated piston 108, and passage 152 is in communication with the front end 132 of the front cylinder 100 through passages 154 in the piston sleeve 122. The other port 148 is in communication with a passage 156 which extends in the coupling member 144 and leads to a passage 158 in the other coupling member 142, with the passage 158 being in communication with the rear end 136 of the front cylinder 100 via a passage 160 in the coupling member 142. The port 146 is also in communication with the front end 134 of the rear cylinder 102, this being achieved in this instance by a passage 162 which branches from the passage 152 in the piston rod 112. Similarly, port 148 is also in communication with the rear end 138 of the rear cylinder 102, this being achieved by a passage 164 which branches from the passage 160 in the coupling member 142. Thus, on admission of fluid under pressure to the port 146 and simultaneously venting the other port 148, the pistons 106 and 108 will be moved to the left (FIG. 3) until the respective jaws 14a and 14b close on the work W (FIG. 1). Further, with the branch passages 162 and 164, or at least one of them, being of smaller cross-sectional area than the remaining fluid passages in accordance with another aspect of the present invention, the volumetric flow rate of operating fluid into the front end 132 of the front cylinder 100 will be greater than that of the operating fluid into the front end 134 of the rear cylinder 102, meaning that the front piston 106 will move to the left (FIG. 3) faster than the rear piston 108, wherefore the centering jaws 14a will close on the work W before the compensating jaws 14b close thereon. Also, while the centering jaws 14a will thus close on work before the compensating jaws 14b close thereon, these jaws 14a and 14b will not exert their full gripping force on work until all of them are in engagement with the work. Thus, the jaws 14a and 14b simultaneously exert their full gripping force on work the moment all of them are closed on the work, thus being due the fact that the passages 162, 152 and 154 afford a permanent by-pass between the front ends 132 and 134 of the front and rear cylinders 100 and 102.

While the jaws 14a and 14b close on work an admission of fluid under pressure to the port 146 and simultaneously venting the other port 148 as described, these jaws will open on admission of fluid under pressure to the port 148 and simultaneously venting the other port 146, with the centering jaws 14a then opening faster than the compensating jaws 14b, as will be readily understood by now.

Admission of fluid under pressure to, and the venting of, the ports 146 and 148 is under the control of a valve 170 (FIG. 3), having a casing 172 and a shiftable valve member 174 therein. Thus, on shifting the valve member 174 to the full-line position in FIG. 3, fluid under pressure from a suitable source is through a conduit 176 admitted into the casing 172 and therein directed by the valve member 174 to a conduit 178 which leads to the port 146, while the other port 148 is simultaneously vented through a conduit 180 which leads to the valve casing 172, and a vent opening 182 in the latter. Conversely, on shifting the valve member 174 to its dot-and-dash line position in the casing 172 (FIG. 3), fluid under pressure is admitted to the port 148 via conduit 176, the valve casing 172 and conduit 180, while the other port 146 is simultaneously vented via conduit 178 and a vent opening 184 in the valve casing 172.

In accordance with another important aspect of the invention, the compensating jaws 14b are convertible into work-centering jaws. To this end, the socket member 72 is releasable lockable to the ball member 76 in the described neutral position of the socket member (FIG. 2) in which the compensating jaws 14b, and more particularly their work-gripping top jaw elements 26b, are centered on the chuck axis x in any position of the compensating plunger 70. The socket member 72 is thus locked against movement from its neutral position by being in this instance backed against and locked to the bottom 88 of the cup-shaped centering plunger 52 on driving a disc or plug 190 into the threaded end 192 of the annular rim formation 86 of the centering plunger 52 (FIG. 5), whereby the bottom 88 of this plunger 52 forces the socket member 72 into its neutral position on back-up of the latter against the plunger bottom 88. The disc or plug 190 is accessible to the centering plunger 52 on removing a cover disc 194 from the chuck body 12, with this cover disc being removably mounted on the chuck body by screws 196 (FIG. 1). Of course, in thus backing the socket member 72 against the bottom 88 of the centering plunger 52, the piston 108 in the rear cylinder 102 will also be backed to the left (FIG. 3), but this does not interfere with normal operation of the chuck with all-centering jaws, since this piston 108 has sufficient freedom of motion in its cylinder 102 to follow the joint operational movements of the now locked plungers 52 and 70. Of course, with the compensating plunger 70 being thus locked to the centering plunger 52 through intermediation of the socket member 72 (FIG. 5), it stands to reason that the converted centering jaws 14b, and more particularly their work-gripping top jaw elements 26b, besides being centered on the chuck axis x, must also be spaced from the chuck axis the same as the work-gripping top jaw elements 26a of the permanent centering jaws 14a, for only then will all jaws simultaneously close on work and center the same in the accustomed manner of a pure centering chuck. In now closing the jaws on work, the permanent centering jaws 14a as well as the converted centering jaws 14b will advance toward the chuck axis x not only simultaneously but also at the same rate, with this advance rate of the jaws being controlled by the rate of yield of the rear piston 108 to the fluid-pressure induced jaw-closing stroke of the front piston 106 to the left (FIG. 3), as will be readily understood.

In view of the aforementioned requirement that for the conversion of the compensating jaws 14b into work-centering jaws, the work-gripping surfaces of the latter must be spaced from the chuck axis $x$ the same as the work-gripping surfaces of the permanent centering jaws 14a, the top jaw elements 26b of the jaws 14b must be in different radial positions on their respective master jaw elements 24b for their action as compensating and centering jaws, respectively. Thus, assuming that the top jaw elements 24b are properly positioned on their master jaw elements 24b for their action as work-centering jaws, i.e., with their work-gripping surfaces spaced from the chuck axis the same as those of the permanent work-centering jaws, it stands to reason that on removing the plug 190 from the centering plunger 52 (FIG. 5) and thereby releasing the compensating plunger 70 and socket member 72 from their lock to the centering plunger 52, the jaws 14b are thereby not reconverted to effective compensating jaws, for the socket member 72 would in many cases back up against the bottom 88 of the centering plunger before all top jaw elements 26b are in engagement with work. Accordingly, conversion of the jaws 14b from centering action to compensating action requires also repositioning of the top jaw elements 26b on their master jaw elements 24b sufficiently toward the chuck axis $x$ that all of these top jaw elements will in their compensating action engage work while the socket member 72 is still spaced from the bottom 88 of the centering plunger 52. By the same token, the top jaw elements 26b require repositioning on their master jaw elements 24b, this time away from the chuck axis $x$, for their conversion from compensating action to center action, as will be readily understood. Such different positioning, or adjustment, of the top jaw elements 26b on their master jaw elements 24b is achieved in this instance by simply meshing the serrated keys 30 of the former with different serrations 28 of the latter.

One of the more important uses for which the present chuck is adapted is to hold hollow work, including hollow work with lighter peripheral walls, for machining the inner as well as outer surfaces thereof. The exemplary work W (FIG. 1) is of that type, having a relatively light peripheral wall and being in this example a blank to be machined into an outer or inner race of a ball bearing. In this example, the work W is first gripped by the jaws 14 at its exemplary outer, unfinished, surface $S_o$ for machining its inner surface $S_i$ to a finish, with the top jaw elements 26b then acting in compensating fashion and being positioned accordingly on their master jaw elements 24b. Having once finish-machined the inner work surface $S_i$, the work is released from the jaws and regripped by the latter at its finished inner surface $S_i$ for machining its outer surface $S_o$ to a finish. For holding the work at its finished inner surface for machining its outer surface, all top jaw elements 26a and 26b are replaced on their respective master jaw elements with top jaw elements having outer work-gripping surfaces. Further, the top jaw elements thus replaced for the top jaw elements 26b preferably and advantageously act in centering fashion, involving application of the plug 190 to the centering plunger 52 for locking the socket member 72 and the compensating plunger 70 to the centering plunger 52 (FIG. 5). The replacing top jaw elements are, of course, so positioned on the master jaw elements that the work-gripping surfaces of the former are equally spaced from the chuck axis $x$ when the socket member 72 and compensating plunger 70 are locked to the centering plunger 52 (FIG. 5). With the replacing top jaw elements having outer work-gripping surfaces, the same are moved radially outwardly into closure on the inner surface of the work, and this is achieved on operating the valve 170 (FIG. 3) to admit fluid under pressure to the port 148 in the non-turning coupling member 144 and simultaneously venting the other port 146.

In the present chuck, all top jaw elements 26a and 26b provide work-gripping parts 26' of typical swivel type, being at 38 pivotally mounted on jaw bases 26" which carry the serrated keys 30 and are releasably mounted on the respective master jaw elements 24. Each of these swivel-type jaw parts 26' affords two spaced work-gripping surfaces, whereby the work portions engaged by gripping jaw surfaces are advantageously spaced quite closely.

Figures 3, 3A, 4:
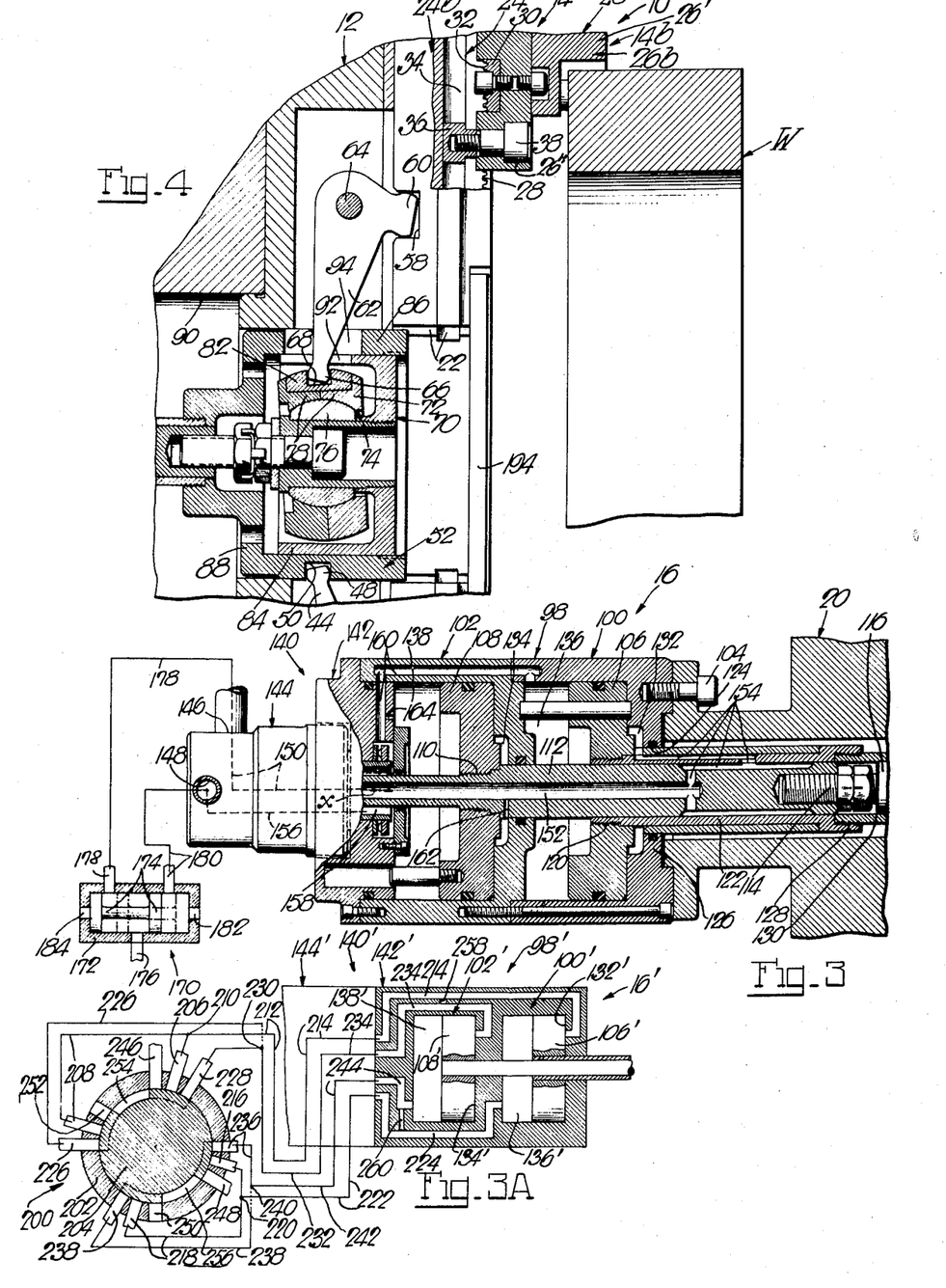
FIG. 3 is a sectional view, partly in elevation, of operating mechanism for the chuck of FIGS. 1 and 2.
FIG. 3A is a diagrammatic sectional view of modified chuck operating mechanism.
FIG. 4 is a fragmentary section through the chuck similar to that of FIG. 2, but showing certain prominent operating parts in a different operating condition.

While in the described chuck operating mechanism 16 of FIG. 3 reliance is had on differential cross-sectional areas of the fluid passages to the various cylinder ends for causing closure of the permanent centering jaws on work before the compensating jaws close thereon, FIG. 3A shows a modified chuck operating mechanism 16' which achieves the same sequential closure of the jaws on work by operation of a control valve 200. This valve 200 provides a casing 202 and an exemplary rotary valve element 204 therein. The cylinder unit 98' with the front and rear cylinders 100' and 102' again forms the operationally rotary member 142' of a swivel coupling 140' having also the complemental non-turning member 144'. The valve casing 202 is in communication with the front end 132' of the cylinder 100' through conduits 206 and 208 which join at 210 and continue as a single conduit 212 to a passage 214 in the swivel coupling 140'. Valve casing 202 is in communication with the rear end 136' of the same cylinder 100' through conduits 216 and 218 which join at 220 and continue as a single conduit 222 to a passage 224 in the swivel coupling 140'. Valve casing 202 is in communication with the front end 134' of the rear cylinder 102' through conduits 226 and 228 which join at 230 and continue as a single conduit 232 to a passage 234 in the swivel coupling 140'. Finally, valve easing 202 is in communication with the rear end 1381 of the rear cylinder 102' through conduits 236 and 238 which join at 240 and continue as a single conduit 242 to a passage 244 in the swivel coupling 140'. Leading to the valve casing 202 are conduits 246 and 248 which are in communication with any suitable source of fluid under pressure. Also provided in the valve casing 202 are vent openings 250 and 252. The rotary valve member 204 is provided with two opposite peripheral grooves 254 and 256. The valve member 204 is shown in a neutral position. For closing chuck jaws with inner work-gripping surfaces on work, the pistons 106' and 108' are to move to the left, the same as the corresponding pistons 106 and 108 in FIG. 3. To that end, valve member 204 is turned from its neutral position clockwise into an operative position in which its grooves 254 and 256 assume their dot-and-dash line positions. In thus turning the valve member 204, fluid under pressure from the conduit 246 will through valve groove 254 be admitted first to the conduit 206 and then to the conduit 228, while the conduits 218 and 238 will through valve groove 256 be successively vented through the opening 250 in the valve casing 202, meaning that fluid under pressure will be admitted first to the front end 132' of the front cylinder 100' and then to the front end 134' of the rear cylinder 102', while the rear end 136' of the front cylinder 100' is vented before the rear end 138' of the rear cylinder 1021 is vented, thereby causing closure of the permanent centering jaws on work before closure of the compensating jaws thereon, as featured. To open the jaws, the valve member 204 is turned anticlockwise from its dot-and-dash line position past its neutral position into the dotted-line position. In thus turning the valve member 204, fluid under pressure from the conduit 248 will through valve groove 256 be admitted first to the conduit 216 and then to the conduit 236, while the conduits 208 and 226 are through the valve groove 254 successively vented at the opening 252 in the valve casing 202, meaning that fluid under pressure is admitted to the rear ends 136' and 138' of the cylinders 100' and 102', and their opposite ends are simultaneously vented. For closing chuck jaws with outer work-gripping surfaces on the inner surface of work, the valve member 204 is, of course, shifted to its dotted-line position, whereby the permanent centering jaws again close on the work before the compensating jaws close thereon, as will be readily understood.

Provisions are also made in the chuck operating mechanism 16' whereby the permanent centering jaws and the compensating jaws will not exert their full work-gripping force until all jaws are in engagement with work. To this end, there are provided in the cylinder unit 98' restricted ducts 258 and 260 between the fluid passages 214, 234 and 224, 244.

Figures 6, 7:
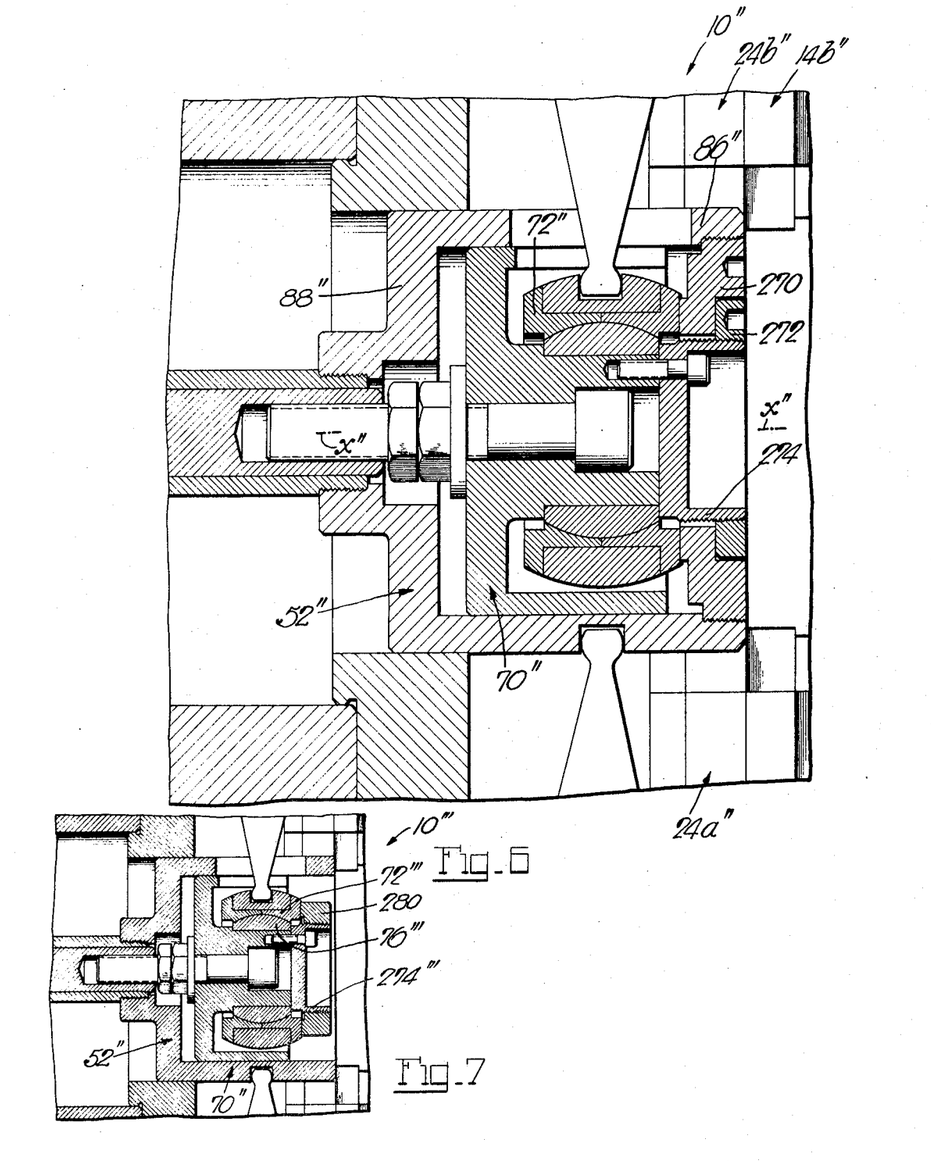
FIG. 6 is an enlarged fragmentary section through a chuck embodying the invention in a modified manner.
FIG. 7 is a fragmentary section through a chuck embodying the invention in a further modified manner.

While in the described chuck 10 of FIGS. 1 and 2 the jaws 14b require, for their conversion from compensating jaws into centering jaws, and vice versa, repositioning of the work-gripping top jaws elements 26b on their master jaw elements 24b, such repositioning of jaw elements is not required in the modified chuck 10" of FIG. 6. Thus, with this modified chuck 10" being in this instance identical with the chuck 10, except for differences described hereinafter, its compensating jaws 14b", formed again by master jaw elements 24b" and work-gripping top jaw elements thereon, are convertible into centering jaw action by again locking the socket member 72" and the compensating plunger 70" to the centering plunger 52". To this end, there are provided in this instance outer and inner ring nuts 270 and 272 of which the outer nut 270 is first threaded into the open end of the annular rim formation 86" of the centering plunger 52", whereupon the inner nut 272 is threaded over a cylindrical retainer member 274 on the compensating plunger 70", whereby the socket member 72", and with it the plunger 70", are drawn toward the applied outer nut 270. The inner nut 272 is thus applied to the retainer member 274 until tightened against the outer nut 270, at which time the socket member 72" is locked in its illustrated neutral position to the outer nut 272, whereby the compensating plunger 70" is then also locked to the centering plunger 52" for joint axial motion. With the exemplary top jaw elements on the master jaw elements 24b" having inner work-gripping surfaces which then are also spaced from the chuck axis x" the same as the work-gripping surfaces of the permanent centering top jaw elements on the other master jaw elements 24a", all jaws will act as centering jaws and close on the outer surface of work on joint axial motion of both plungers 52" and 70" to the left. To reconvert the jaws 14b" into compensating jaws, it is merely necessary to remove the inner and outer nuts 272 and 270 from the chuck and thereby restore the independent axial movability of the compensating plunger 70". Any repositioning of the top jaw elements on the master jaw elements 24b" for converting their action from centering to compensating is entirely unnecessary, because all of these top jaw elements, when acting in compensating fashion, will certainly engage work well before the compensating plunger 70" could, in its jaw-closing movement to the left, back against the bottom 88" of the centering plunger 52", as will be readily understood. The same holds true on replacement of all top jaw elements with inner work-gripping surfaces with top jaw elements having outer work-gripping surfaces, in which case the jaws close on work on axial movement of the plungers 52" and 70" to the right, and all top jaw elements on the master jaw elements 24b" will, when acting in compensating fashion, certainly close on the work while the compensating plunger 70" and the bottom 88" of the centering plunger 52" are effectively spaced from each other.

While in the modified chuck 10" of FIG. 6 the compensating plunger 70" is also locked to the centering plunger 52" for joint axial motion on locking the socket member 72" in its neutral position for conversion of the compensating jaws into centering jaws, FIG. 7 shows a further modified chuck 10''' which may in all respects be like the described chuck 10", except that for conversion of the compensating jaws into centering jaws the socket member 72''' is locked in its neutral position without locking the compensating plunger 70''' to the centering plunger 52'''. To this end, a single nut 280 is threaded over the retainer member 274'''into firm engagement with the socket member 72''' which is thereby shifted into its neutral position and locked in this position against any universal motion on the ball member 76'''. The compensating plunger 70''' is thus free to be moved axially independently of the centring plunger 52''' by and under the sole control of its piston in the chuck operating mechanism. While this means that in closure of the jaws on work, the converted centering jaws will close on the work after the permanent centering jaws close thereon in keeping with the featured performance of the exemplary chuck operating mechanism 16 (FIG. 3) this does in no wise interfere with entirely satisfactory and correct work-centering action of all the jaws, for the jaws will simultaneously exert their full work-gripping force on the work only when all jaws are in engagement with the work.

What is claimed is:

1. In a chuck, the combination of a body with an axis; first and second jaws guided on said body for movement radially of said axis, of which said first jaws are angularly spaced to hold work; first and second plungers coaxial with said axis and guided in said body for independent axial movement; first operating connections between said first plunger and first jaws to move the latter to and from closure on work on axial movement of said first plunger in first and second opposite directions, respectively, and to keep said first jaws centered on said axis; other operating connections between said second plunger and second jaws for moving the latter to and from closure on work on axial movement of said plunger in said first and second directions, respectively, with said other operating connections including companion members on which one is fixed to said second plunger and the other is mounted on said one member for universal motion thereon to cause said second jaws to act in compensating fashion; means for releasably locking to said one member said other member in a neutral position in which said second jaws are centered on said axis for their conversion into centering jaws, with said second plunger having freedom of axial motion in said first direction beyond a relative position of said plungers in which said converted jaws are spaced from said axis the same as said first jaws; first and second cylinders coaxial with said axis and having therein pistons operatively connected with said first and second plungers, respectively; and a device, including an operable control and a by-pass between the jaw-closing ends of said cylinders, and operative on operation of said control for supplying said jaw-closing cylinder ends with fluid under pressure in such timed relation that said first jaws will close on work before said second jaws close thereon, and said jaws will simultaneously exert their full work-gripping force when all jaws are closed on work.

2. The combination in a chuck as in claim 1, which further provides means for releasably locking said plungers to each other in said relative position for joint axial motion.

3. The combination in a chuck as in claim 1, in which said means is operative releasably to lock to said one member said second member in said neutral position and simultaneously releasably lock said plungers to each other in said relative position for joint axial motion.

4. A chuck, providing a body with an axis; first and second jaws guided on said body for movement radially of said axis, of which said first jaws are angularly spaced to hold work; first and second plungers coaxial with said axis and guided in said body for independent axial movement; first operating connections between said first plunger and first jaws to move the latter to and from closure on work on axial movement of said first plunger in first and second opposite directions, respectively, and to keep said first jaws centered on said axis; other operating connections between said second plunger and second jaws for moving the latter to and from closure on work on axial movement of said plunger in said first and second directions, respectively, with said other operating connections including companion members of which one is fixed to said second plunger and the other is mounted on said one member for universal motion thereon to cause said second jaws to act in compensating fashion; means for releasably locking to said one member said other member in a neutral position in which said second jaws are centered on said axis for their conversion into centering jaws, with said second plunger having freedom of axial motion in said first direction beyond a relative position of said plungers in which said converted jaws are spaced from said axis the same as said first jaws; and chuck operating mechanism, including first and second double-acting cylinders coaxial with said axis and having therein pistons operatively connected with said first and second plungers, respectively, first and second fluid passages leading to the jaw-closing and jaw-opening ends, respectively, of said first cylinder, and third and fourth fluid passages branching from said first and second passages, respectively, and leading to the jaw-closing and jaq-opening ends, respectively, of said second cylinder, of which at least one of said branching passages is of smaller cross-sectional area than the remaining passages, so that on admission of fluid under pressure to said first passage and simultaneously venting said second passage, said first jaws will close on work before said second jaws close thereon, and said jaws will simultaneously exert their full gripping force when all jaws are closed on work.

5. A chuck as in claim 4, in which said cylinders are adapted to turn with said chuck body about said axis, and said chuck operating mechanism further provides a swivel coupling having companion sections, of which one section is turnable with said cylinders and the other section is non-turning and has two fluid ports, and said passages are provided in said chuck operating mechanism, with said first and second passages extending from said fluid ports, respectively.

6. A chuck as in claim 4, which further provides means for releasably locking said plungers to each other in said relative position for joint axial motion.

7. A chuck as in claim 4, in which said means is operative releasably to lock said one member to said other member in said neutral position and simultaneously releasably lock said plungers to each other in said relative position for joint axial motion.

8. A chuck as in claim 4, in which said jaws are moved for closure on work in one of two directions toward and away from said axis, respectively, and said jaws are moved in the other of said directions for closure on work on admission of fluid under pressure to said second passage and simultaneously venting said first passage.

9. A chuck as in claim 8, in which each of said jaws provides a master jaw operatively connected with the associated plunger and guided in said body, and a work-gripping top jaw removably mounted on said master jaw, whereby top jaws with inner work-gripping surfaces may be replaced on said master jaws with top jaws with outer work-gripping surfaces, and vice versa.

10. A chuck as in claim 9, in which each master jaw is a serrated jaw, and each top jaw has a serrated key and is removably mounted on a master jaw with its key in mesh with any serrations of a master jaw.

* * * * *